April 2, 1963 W. W. CARTER ETAL 3,083,776
APPARATUS FOR HARVESTING SUB-SURFACE CROPS
Filed Aug. 28, 1961 3 Sheets-Sheet 1

FIG-1

INVENTOR.
William W. Carter
Charlie F. Carter
BY
Jennings, Carter & Thompson
Attorneys

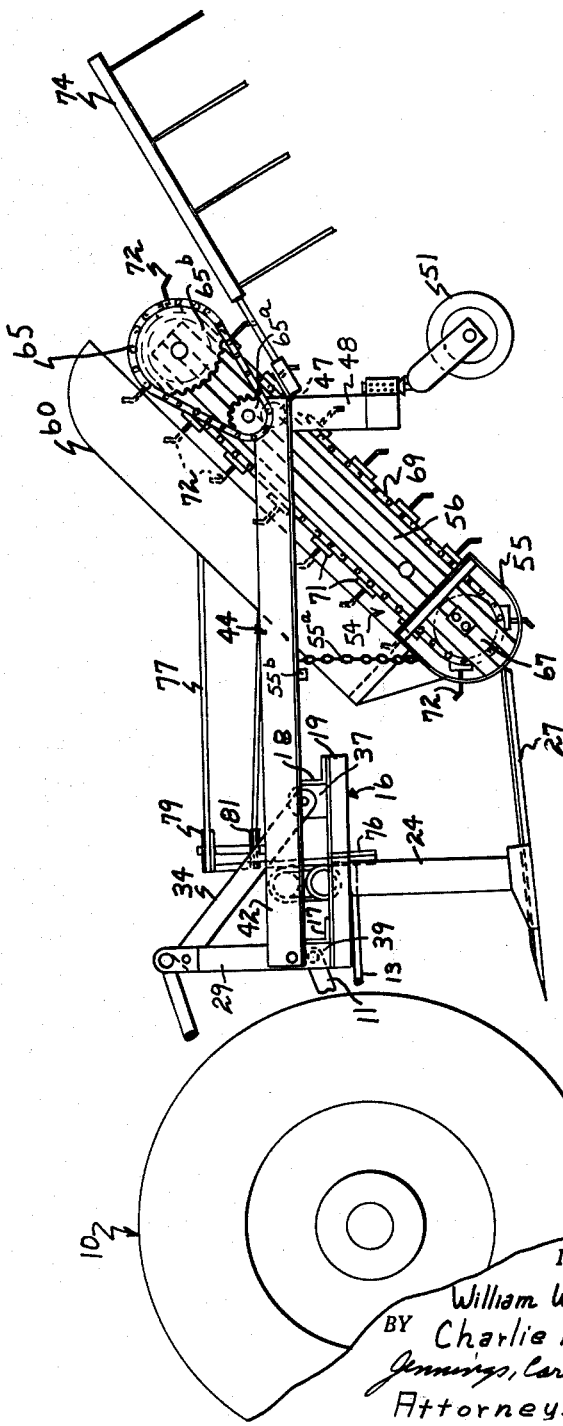

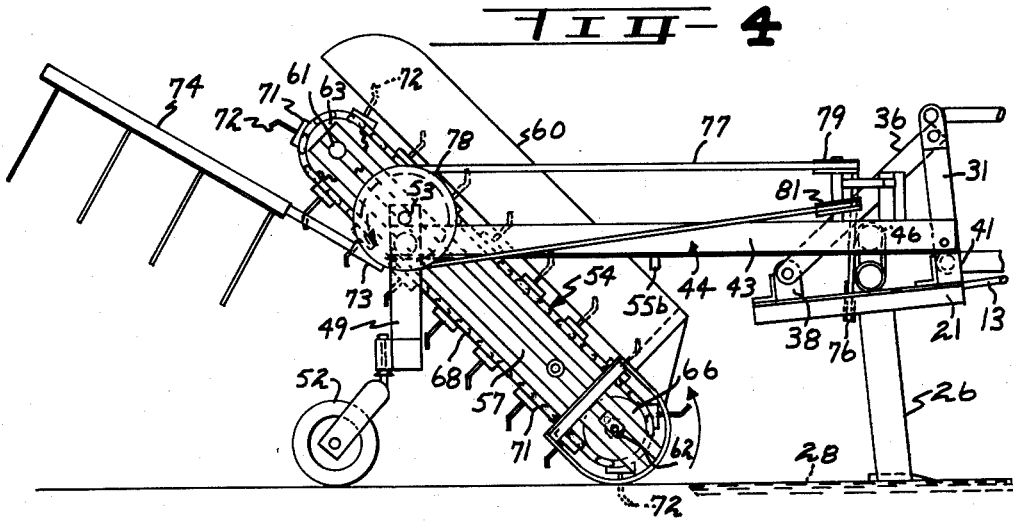
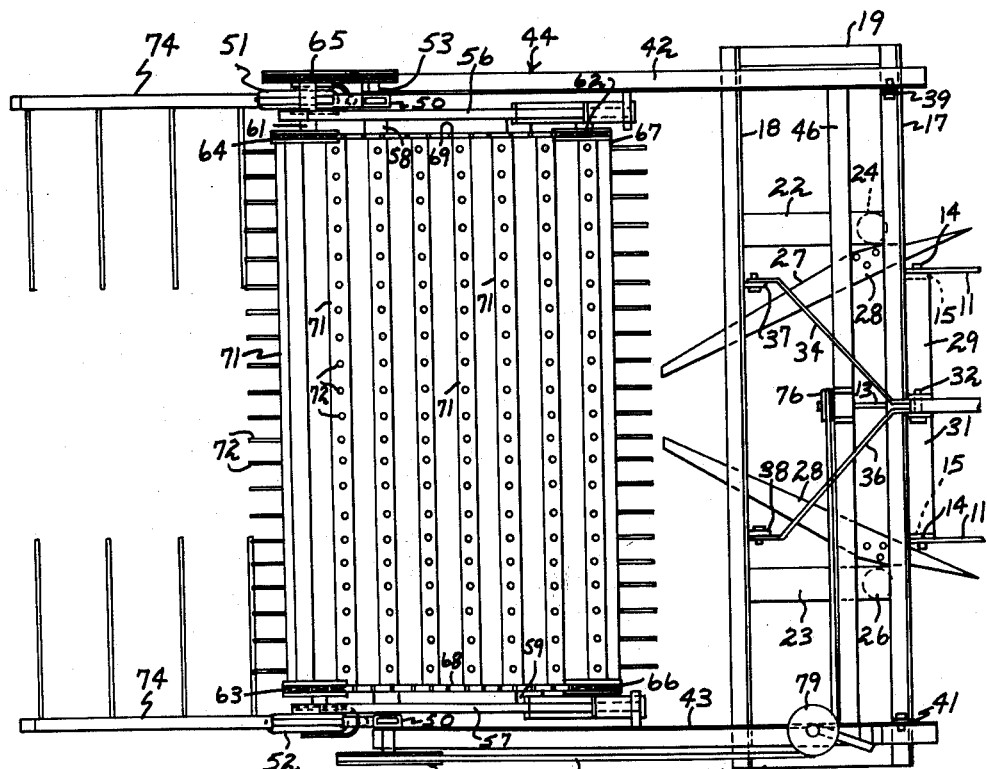

3,083,776
APPARATUS FOR HARVESTING SUB-SURFACE
CROPS
William W. Carter and Charlie F. Carter, both of
Brundidge, Ala.
Filed Aug. 28, 1961, Ser. No. 134,466
5 Claims. (Cl. 171—101)

This invention relates to apparatus for harvesting subsurface crops, such as peanuts and the like, and has for an object the provision of apparatus of the character designated which shall include improved means for plowing up the vines carrying the peanuts, removing the vines and peanuts from the soil, shaking the dirt loose from the roots and the nuts, and then placing the vines carrying the peanuts in windrows.

Another object of our invention is to provide apparatus for harvesting sub-surface crops of the character designated in which the means for plowing up the vines carrying the peanuts is adapted for independent movement in a vertical direction, whereby the plows may accommodate themselves to the contour of the ground, thus particularly adapting our apparatus for use in harvesting peanuts from grounds having irregular surfaces.

Another object of our invention is to provide a harvester for sub-surface crops of the character designated in which the entire apparatus for handling the crop is supported by a tractor when the draft means for the tractor is raised a predetermined amount, thereby facilitating turning the apparatus around in the field.

Another object of our invention is to provide harvesting apparatus of the character designated in which the apparatus for handling the crop is supported by ground engaging wheels carried by the rear portion of the apparatus while the apparatus is in operating position, thereby making the apparatus substantially self-supporting and at the same time eliminating excessive loading of the rear end of the tractor.

Another object of our invention is to provide a harvester of the character designated in which the means for picking up and handling the vines carrying the peanuts is adapted for pivotal movement relative to the remainder of the apparatus whereby the apparatus is adapted for movement over obstacles, such as rocks and the like, without damage to the harvester.

A further object of our invention is to provide a harvester of the character designated in which the rear end of the apparatus does not dig into the ground upon lifting the front portion of the apparatus.

A further object of our invention is to provide a harvester of the character designated in which excessive weights are not applied to the ground engaging plows, thereby adapting the plows for uniform operation at any desired elevation.

A still further object of our invention is to provide a harvester of the character designated which shall be simple of construction, economical of manufacture, and one which may be attached to conventional type tractors having draft means and lift means associated therewith.

Briefly, our improved apparatus comprises means for plowing up the top surface of the soil containing the subsurface crop, such as peanuts, and means to pick up and deliver rearwardly the crop plowed up whereby the soil and foreign materials are separated from the crop. The means for plowing up the sub-surface crop is adapted for independent movement relative to the main frame of the apparatus and the means for picking up and delivering rearwardly the crop thus plowed up is also adapted for independent movement relative to the main frame whereby the plowing mechanism may be set at any desired elevation and the pick-up and conveying apparatus is adapted for pivotal movement over obstacles, such as large stones and the like. Also, the rear end of the main frame is supported by ground engaging wheels when the apparatus is moved to operative position whereby the heavy weight of the crop is supported by the ground engaging wheels to thus relieve the rear end of the tractor of this load.

A harvester embodying features of our invention is illustrated in the accompanying drawings, forming a part of this application, in which:

FIG. 1 is a side elevational view, partly broken away, showing our improved apparatus associated with a tractor with the harvester lowered to operative position;

FIG. 2 is a side elevational view, partly broken away, showing the harvester raised to inoperative position;

FIG. 3 is a plan view of the harvester, parts being broken away and in section and the side boards for the conveyor being omitted for the sake of clarity; and, FIG. 4 is a side elevational view, partly broken away and in section, showing the opposite side of the harvester from that shown in FIGS. 1 and 2.

Referring now to the drawings for a better understanding of our inventions, we show a tractor 10 having a suitable draft structure indicated generally at 11 and lift means indicated generally at 12 which is operatively connected to the draft structure 11 for raising and lowering the same in a manner well understood in the art. Also, a power take-off shaft 13 is operatively connected to the power unit of the tractor in the usual manner.

Pivotally connected to the draft structure 11 by suitable pivot members 14 is the forward end of a plow frame indicated generally at 16. The plow frame 16 comprises a pair of transversely extending angle members 17 and 18 which are connected to each other at their ends by angle members 19 and 21. Brackets 15 are secured to the forward side of angle member 17 for receiving the pivot members 14. To add further strength to the plow frame 16, we provide suitable intermediate brace members which may be in the form of channels 22 and 23, as shown in FIG. 3. Secured to and depending from the channel members 22 and 23 are vertically extending support members 24 and 26 which carry ground engaging plows 27 and 28, respectively, at the lower ends thereof. By providing vertically extending support members 24 and 26, instead of inclining the support members, vines and the like do not gather around the supports for the plows.

Also pivotally connected to the brackets 15 by pivot pins 14 are upstanding arms or straps 29 and 31 which extend inwardly and then upwardly substantially parallel to each other, as shown in FIG. 3. The upper ends of the straps 29 and 31 are connected to each other and to the lift mechanism 12 by a suitable pivot pin 32. Pivotally connected to the upstanding portion of the straps 29 and 31 by a suitable pivot pin 33 are downwardly and rearwardly sloping arms or straps 34 and 36. The rear ends of the straps 34 and 36 are pivotally connected to upstanding brackets 37 and 38 carried by the rear portion of the plow frame 16. It will thus be seen that upon actuating the lift mechanism 12 for the draft unit 11, the plow frame 16 may be raised and lowered to any selected elevation. In view of the fact that the draft mechanism and the lift mechanism therefor is standard type equipment employed on conventional tractors, no further description thereof is deemed necessary.

Mounted adjacent the forward end of the plow frame 16 and at each side thereof are upstanding brackets 39 and 41. Pivotally connected to the upstanding brackets 39 and 41 are elongated side members 42 and 43 of a main frame indicated generally at 44. The forward portions of the side members 42 and 43 are rigidly connected to each other by a transverse member 46 which may be in the form of a pipe or the like. The rear portion of the side members 42 and 43 are rigidly connected to each other by a transverse member 47. Secured to the rear ends of the side members 42 and 43 and to the transverse member 47 are depending support members 48 and 49. Mounted for pivotal movement in a horizontal plane adjacent the lower ends of the support members 48 and 49 are caster wheel units 51 and 52, respectively.

As shown in FIGS. 1, 2 and 4, the support members 48 and 49 project upwardly above the side members 42 and 43 and are provided with suitable openings therethrough for receiving a transverse shaft 53. The shaft 53 is mounted for rotation in suitable bearings 50 carried by the support members 48 and 49. Mounted for pivotal movement about the transverse shaft 53 is a downwardly and forwardly sloping conveyor frame indicated generally at 54. The conveyor frame 54 comprises a pair of side members 56 and 57 connected to each other by suitable transverse members 58 and 59 as shown in FIG. 3. Mounted for rotation in suitable bearings adjacent the upper and lower ends of the elongated side members 56 and 57 are transverse shafts 61 and 62. The shaft 61 is operatively connected to the shaft 53 by a sprocket chain 65 and sprockets 65$^a$ and 65$^b$ carried by the shafts 53 and 61, respectively. Secured non-rotatably to the shaft 61 inwardly of the side members 56 and 57 are sprockets 63 and 64. Mounted on the shaft 62 in alignment with the sprockets 63 and 64 are drums 66 and 67, respectively. Passing around the sprocket 63 and drum 66 is a sprocket chain 68 and passing around the sprocket 64 and the drum 67 is a sprocket chain 69. Extending transversely of and secured to the sprocket chains 68 and 69 are a plurality of spaced apart bars 71. The transverse bars 71 carry a plurality of outwardly projecting tines 72 which are formed of a resilient material whereby the peanuts or the like may be picked up and transferred onto the conveyor and then delivered rearwardly of the conveyor frame. Preferably, the tines 72 are provided with offset portions adjacent the free ends thereof which extend forwardly in the direction of travel of the conveyor. That is, the sprocket chains 68 and 69, together with the transverse bars 71 and the tines carried thereby define an endless conveyor unit for picking up the crop plowed up by the plow 27 and 28. Curved guide members 55 are provided at the lower end of the conveyor frame 54 in position to engage obstacles, such as rocks and the like, whereby the lower end of the conveyor frame is adapted to move over such obstacles. Downward movement of the conveyor frame 54 is limited by a flexible member, such as a chain 55$^a$, which extends between the main frame 44 and the lower end of the conveyor frame 54. Also, upward movement of the forward end of the conveyor frame 54 is limited by a suitable stop 55$^b$ carried by the main frame 44.

Mounted at the rear of the main frame 44 and extending upwardly and rearwardly therefrom are a pair of tubular members 73 which are adapted to support rearwardly and upwardly extending deflector members 74 which direct the crop being harvested toward the center and rearwardly of the apparatus whereby the crop is placed in windrows. Suitable side boards 60 are mounted at each side of the conveyor frame to aid in retaining the crop on the conveyor.

The drive shaft 13 is operatively connected to a pulley 76 which in turn is connected in driving relation by a V-belt 77 to a pulley 78 carried by the shaft 53. Suitable idler pulleys 79 and 81 are mounted on the frame 44, as shown, whereby the V-belt 77 is guided around the conveyor frame 54.

From the foregoing description, the operation of our improved harvester will be readily understood. The plow frame 16 is connected to the draft structure 11 and the lift member 12 whereby upon actuating the lift member 12, the plow frame is raised or lowered to selected elevations. When it is desired to plow up the sub-surface crop, the lift member 12 is moved in a direction whereby the plow frame 16 is lowered to operative position, as shown in FIGS. 1 and 4. In this position, the plows 27 and 28 enter the soil and thereby plow up the crop, such as vines carrying peanuts. As the vines are plowed up, the tines 72 of the endless conveyor pick up the vines and transfer the same upwardly and rearwardly of the conveyor frame 54 onto the deflector member 74 whereby the vines carrying the peanuts are deposited in windrows. Since the plow frame 16 is adapted for independent movement relative to the main frame 44 and the conveyor frame 54, the plow frame readily accommodates itself to the contour of the ground over which it passes. In view of the fact that the rear end of the main frame 44 is supported by the ground engaging wheels 51 and 52, excessive loads are not placed on the plow frame 16 and the rear end of the tractor 10. That is to say, the vines handled by the conveyor frame 54 are extremely heavy and would place a heavy load on the plow frame 16 and the rear end of the tractor were it not for the independent support provided by the caster wheel units 51 and 52.

The conveyor frame 54 is adapted for pivotal movement about the shaft 53, which is the shaft supplying power to the conveyor, thereby permitting free pivotal movement of the conveyor frame 54 without interfering with the supply of power thereto. Downward movement of the lower end of the conveyor frame 54 is limited by the vertical member 55$^a$ and upward movement thereof is limited by the stop member 55$^b$. As the curved guide member 55 engages an obstacle, such as a rock or the like, the lower end of the frame is pivoted upwardly over the obstacle whereby the conveyor frame returns to operative position immediately upon passing over the obstacle, thus assuring that the tines 72 remove all of the crop plowed up by the plows 27 and 28.

When it is desired to turn the apparatus around in the field, such as at the end of the rows, the lift means 12 is actuated whereby the plow frame is lifted. After the plow frame 16 moves a predetermined distance, the transverse angle 18 carried thereby engages the undersurface of the main frame 44, as shown in FIG. 2, whereby the entire main frame and conveyor frame 54 are lifted out of engagement with the ground. In this position, the entire apparatus is supported by the tractor whereby a minimum of space is required to turn the apparatus around and a minimum of damage is caused to the field.

From the foregoing, it will be seen that we have devised an improved harvester for sub-surface crops. By providing a harvester having a plow frame which is adapted for independent movement relative to the remainder of the frame, the plows may be adjusted to any desired elevation and at the same time, the plows follow the contour of the ground. Also, by providing a main frame which is adapted for a limited amount of pivotal movement relative to the plow frame, together with means limiting this pivotal movement relative to the frames, the main frame and the entire apparatus carried thereby is lifted along with the plow frame upon elevation of the plow frame above a predetermined point. Also, by providing ground engaging support wheels adjacent the rear of the main frame, most of the load of the green vines and the like carried by the conveyor frame are supported independently of the tractor and the plow frame. Furthermore, by providing a conveyor frame which is adapted for independent pivotal movement relative to the main frame, together with a power shaft which is mounted for rotation at the pivotal point of the conveyor frame, the conveyor frame is adapted for free pivotal movement over obstacles whereby the apparatus is adapted for operation over surfaces having obstacles thereon, such as rocks and the like.

While we have shown our invention in but one form, it will be obvious to those skilled in the art that it is not so limited but is susceptible of various changes and modifications without departing from the spirit thereof, and we desire, therefore, that only such limitations shall be

What we claim is:

1. In a harvester for sub-surface crops adapted for attachment to a tractor having draft means and lift means operatively connected to said draft means for raising and lowering said draft means, a plow frame operatively connected to said draft means to be raised and lowered therewith, a ground engaging plow carried by said plow frame and disposed to move to operative position upon lowering said plow frame, a rearwardly extending main frame pivotally supported adjacent its forward end by said plow frame and adapted for vertical movement relative thereto whereby said plow frame is adapted for independent movement relative to said main frame, means limiting vertical movement of said plow frame relative to said main frame upon lifting said plow frame whereby said main frame moves upwardly with said plow frame after said plow frame has been lifted a predetermined amount, depending ground engaging means mounted adjacent the rear of said main frame disposed to support the rear end of said main frame upon lowering said plow frame to operative position, a downwardly and forwardly sloping conveyor frame mounted adjacent its upper end to the rear of said main frame and adapted for pivotal movement relative to said main frame and said plow frame, and a downwardly and forwardly sloping pick-up conveyor carried by said conveyor frame to pick up and deliver rearwardly the crop plowed up by said plow.

2. A harvester for sub-surface crops as defined in claim 1 in which the ground engaging plow is supported from the plow frame by a vertically extending support member.

3. In a harvester for sub-surface crops adapted for attachment to a tractor having draft means and lift means operatively connected to said draft means for raising and lowering said draft means, a plow frame operatively connected to said draft means to be raised and lowered therewith, a ground engaging plow carried by said plow frame and disposed to move to operative position upon lowering said plow frame, a rearwardly extending main frame pivotally supported adjacent its forward end by said plow frame and adapted for vertical movement relative thereto, means limiting vertical movement of said plow frame relative to said main frame upon lifting said plow frame whereby said main frame moves upwardly with said plow frame after said plow frame has been lifted a predetermined amount, ground engaging wheels mounted adjacent the rear of said main frame disposed to support the rear end of said main frame upon lowering said plow frame to operative position, a downwardly and forwardly sloping conveyor frame mounted adjacent its upper end to the rear of said main frame and adapted for pivotal movement relative to said main frame and said plow frame, at least one sprocket mounted for rotation adjacent the upper end of said conveyor frame, a drum mounted for rotation adjacent the lower end of said conveyor frame in alignment with said sprocket, a sprocket chain passing around said sprocket and said drum, a plurality of pick-up conveyor units carried by said sprocket chain disposed to pick up and deliver rearwardly the crop plowed up by said plow, and means to drive said sprocket.

4. A harvester for sub-surface crops as defined in claim 3 in which the means to drive the sprocket comprises a transverse shaft mounted for rotation at the point about which said conveyor frame pivots, means to rotate said transverse shaft, and means operatively connecting said transverse shaft to said sprocket whereby said sprocket is driven by said transverse shaft and said conveyor frame is adapted for a limited amount of free pivotal movement about said transverse shaft.

5. A harvester for sub-surface crops as defined in claim 4 in which the sprocket is mounted on a rotatable shaft which is connected in driving relation to said transverse shaft by aligned sprockets mounted on the transverse shaft and said rotatable shaft.

References Cited in the file of this patent

UNITED STATES PATENTS

| | | |
|---|---|---|
| 2,562,659 | Carter et al. | July 31, 1951 |
| 2,952,321 | Lyle et al. | Sept. 13, 1960 |